(12) United States Patent
Backman

(10) Patent No.: US 8,538,628 B2
(45) Date of Patent: Sep. 17, 2013

(54) CONTROL DEVICE

(75) Inventor: Fredrik Backman, Frankfurt am Main (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/236,759

(22) Filed: Sep. 20, 2011

(65) Prior Publication Data

US 2012/0072072 A1    Mar. 22, 2012

(30) Foreign Application Priority Data

Sep. 21, 2010  (DE) .......................... 10 2010 046 125

(51) Int. Cl.
*B60K 37/06*    (2006.01)
*B60Q 1/34*     (2006.01)

(52) U.S. Cl.
CPC ................ *B60K 37/06* (2013.01); *B60Q 1/343* (2013.01); *B60K 2350/1028* (2013.01); *B60K 2350/1036* (2013.01); *B60K 2350/928* (2013.01)
USPC .......................................................... 701/36

(58) Field of Classification Search
USPC ......... 701/36, 418, 538; 345/173; 340/425.5
IPC .................................................... G06F 3/0333
See application file for complete search history.

(56) References Cited

U.S. PATENT DOCUMENTS 5,920,363 A * 7/1999 Rofe ................................ 349/96
6,720,938 B2 * 4/2004 Ohkawara et al. ................. 345/7
6,819,990 B2 * 11/2004 Ichinose .......................... 701/36
7,295,904 B2   11/2007 Kanevsky et al.
7,407,190 B2 *  8/2008 Berg et al. ..................... 280/775
2003/0023353 A1* 1/2003 Badarneh .......................... 701/1
2006/0132924 A1  6/2006 Mimran
2006/0155431 A1  7/2006 Berg et al.
2009/0189373 A1  7/2009 Schramm et al.
2010/0101921 A1* 4/2010 Howie et al. ............... 200/61.54
2011/0025584 A1* 2/2011 Nishigasako et al. ........... 345/76

FOREIGN PATENT DOCUMENTS

| DE | 4328564 C1 | 8/1994 |
|---|---|---|
| DE | 10352044 A1 | 6/2005 |
| DE | 102004031659 A1 | 6/2006 |
| EP | 1577191 A2 * | 9/2005 |
| EP | 2055522 A1 | 5/2009 |
| FR | 2959036 A1 | 10/2011 |
| WO | 2006025891 A2 | 3/2006 |
| WO | 2010042101 A1 | 4/2010 |

OTHER PUBLICATIONS

UK IPO, British Search Report for Application No. 1113188.5, dated Nov. 24, 2011.

* cited by examiner

*Primary Examiner* — James Trammell
*Assistant Examiner* — Todd Melton
(74) *Attorney, Agent, or Firm* — Ingrassia Fisher & Lorenz, P.C.

(57) ABSTRACT

A control device is provided for integration in a vehicle that includes, but is not limited to a steering arrangement, that includes, but is not limited to a steering device and a steering column. The control device is configured to control an information display arrangement that includes, but is not limited to a display device. The control device is formed by at least one touch-sensitive surface, which is aligned radially to an imaginary straight line G through a center of the steering device, and/or which is directed toward a driver's and/or passenger's door of the vehicle.

16 Claims, 5 Drawing Sheets

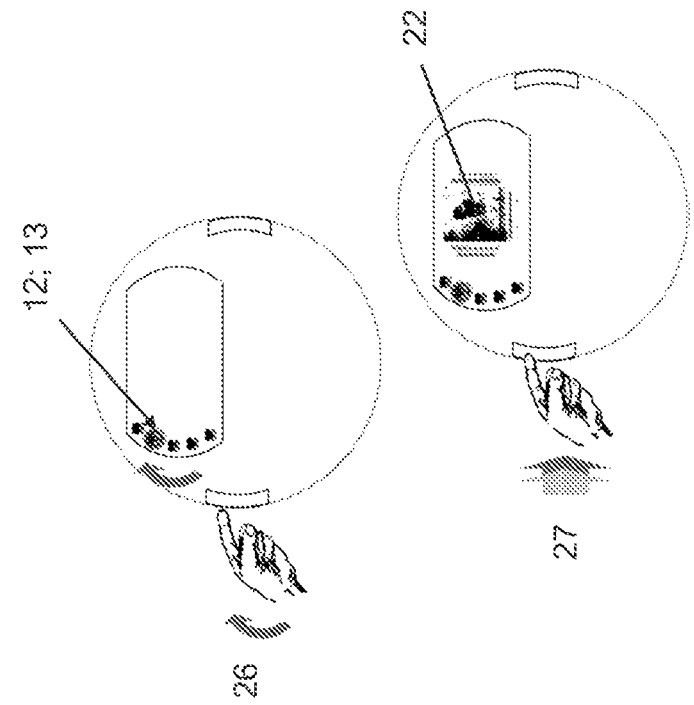
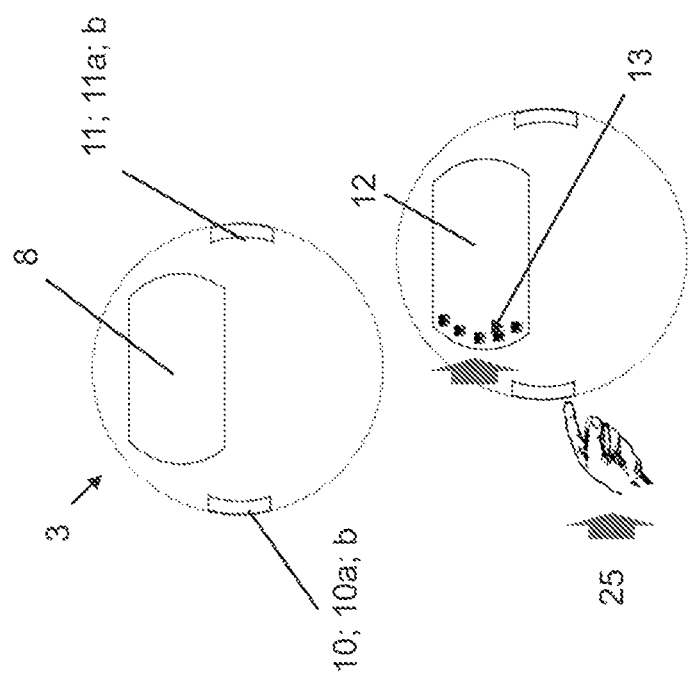

CONTROL DEVICE

CROSS-REFERENCE TO RELATED APPLICATION

This application claims priority to German Patent Application No. 102010046125.3, filed Sep. 21, 2010, which is incorporated herein by reference in its entirety.

TECHNICAL FIELD

The technical field relates to a control device for integration in a vehicle.

BACKGROUND

Control devices are disposed in many vehicles for the activation and control of display devices. It is thereby rendered possible for a vehicle driver, for example, to individually vary or adapt a route display, volume display, and/or temperature display etc. The control devices usually comprise control knobs or switches or they are formed by touch-active surfaces, so-called touchpads.

Document EP 2 055 522 A1, which probably forms the nearest prior art, describes a human-machine interface formed by a touchpad, which is integrated in a display. The touchpad can be varied from a first position into a second position, wherein in the first position it is only partially visible for a vehicle driver since it is partly covered by a steering wheel. In the second position the touchpad is located adjacent to the steering wheel and is completely visible for the vehicle driver. In both positions the touchpad and the display is directed toward a rear side of the vehicle.

It is at least object to provide a control device for a vehicle, which is disposed functionally and ergonomically advantageously in the vehicle. In addition, other objects, desirable features and characteristics will become apparent from the subsequent summary and detailed description, and the appended claims, taken in conjunction with the accompanying drawings and this background.

SUMMARY

A control device is proposed for integration in a vehicle. The vehicle is preferably configured as a passenger car or a truck. It has a steering arrangement, which comprises a steering device and a steering column. The steering device is preferably configured as a steering wheel and/or a steering lever. In particular, the steering column is configured to connect the steering device to a dashboard or to an instrument or system panel. Optionally, the steering device is fastened by the steering column in a vehicle interior. The steering column usually has a cladding, which is configured to clad the steering column and shield toward the vehicle interior. The control device is configured to control an information display arrangement. Optionally, the control device is configured to activate and/or set the information display arrangement.

The information display apparatus is configured to display and/or visualize in condensed form displays, in particular information and/or instructions, to a vehicle driver and/or other vehicle occupants. To this end, it comprises at least one display device, which in particular is configured as an electromechanical, electrical, and/or electronic display. The display device is particularly preferably configured as a screen and/or display, e.g. as a liquid crystal display (LCD), an active matrix display (TFT display), and/or as a fluorescent display. In particular, the display device is configured to visually present information and/or instructions, e.g. in the form of letters, numbers, images, and/or symbols. It is feasible that the at least one display device comprises display and/or signal lights and/or is supplemented by these. The display and/or signal lights can be formed, for example, by light-emitting diodes (LEDs) and/or by organic light-emitting diodes (OELDs).

In an embodiment, the information display arrangement comprises a first and second display arrangement. Optionally in addition, it comprises a third and/or fourth display device. In particular, the at least one display device is configured as a first, second, third, and fourth display device. The display devices are especially disposed in the vehicle interior.

The control device is preferably formed by at least one touch-sensitive surface. The touch-sensitive surface is preferably configured to be circular or oval. Any other ergonomically suitable surface shape such as, for example, a quadratic or rectangular shape, is also feasible. In particular, the touch-sensitive surface is configured as a so-called touchpad, especially as a conducting infrared touch-sensitive touchpad. It is particularly preferred that the touch-sensitive surface has no additional switches and/or knobs. However, it cannot be completely excluded that the control device can also comprise control buttons and/or knobs and/or rotary and/or toggle switches.

The touch-sensitive surface is aligned radially to an imaginary straight line through a center of the steering device. In particular, the touch-sensitive surface is oriented radially to an axis of rotation of the steering wheel. It is particularly preferred that the touch-sensitive surface extends along a circular orbit section about the straight line or forms it. For example, the touch-sensitive surface has a radius, which is adapted to a radius of a steering wheel rim or is the same as this. Optionally, the radius of the touch-sensitive surface preferably differs by up to approximately 35 percent, in particular up to approximately 25 percent, especially up to approximately 15 percent from the radius of the steering wheel rim. It is also feasible that the touch-sensitive surface has a radial profile, which has continuously varied radial values.

Alternatively or additionally, the touch-sensitive surface is directed toward a driver's and/or passenger's door of the vehicle. The touch-sensitive surface is preferably disposed parallel to the driver's and/or passenger's door. In particular, an intermediate angle of up to approximately 45 degrees, in particular up to approximately 30 degrees, especially up to approximately 15 degrees, can exist between the touch-sensitive surface and the driver's and/or passenger's door. Especially, the touch-sensitive surface is not directed in the direction of the vehicle driver, in particular not to a vehicle rear. Usually, the touch-sensitive surface is not completely visible for the vehicle driver when he is located on a driver's seat. Preferably the touch-sensitive surface is preferably only up to approximately 30 percent, in particular up to approximately 20 percent, especially up to approximately 10 percent visible for the vehicle driver on the driver's seat in a perspective view.

It is advantageous that the control device is easy for the vehicle driver to reach during the journey, in particular during a steering process since it is disposed in the area of the steering device. In addition, the vehicle driver is not caused to direct his view away from a roadway during the journey. The touch-sensitive surface makes it possible for the vehicle driver to use and operate the control device and the at least one display device conveniently, safely, and intuitively, without taking his hands from the steering wheel. Complex settings on control knobs or switches, which are in particular located at a distance from the steering wheel, can be omitted. As a result of short distances between the steering device and the control device and due to the easy-to-operate touch-sensitive surface, an ergonomically improved control device can be provided in the vehicle interior. The ergonomic arrangement of the control device can advantageously reduce a physical loading of the vehicle driver. The vehicle driver is less distracted during the journey, fatigue and inattentiveness of the vehicle driver can be reduced, and resulting accidents can be avoided.

It is furthermore advantageous that a use of future technologies such as, for example, touchpads can codetermine or influence a design in the vehicle interior. Furthermore, the control device can be disposed in a space-saving manner in the vehicle interior by combining functions and dispensing with switches and/or knobs, whereby a more generous vehicle interior can be created.

In an embodiment, the touch-sensitive surface extends at least partially along a semicircular arm movement area of a vehicle driver, who is located on a driver's seat in front of a steering arrangement. The semicircular arm movement area is formed by an arm movement of the vehicle driver in the direction of the steering arrangement. Preferably a hand inner surface of the vehicle driver is directed toward the steering device during the semicircular arm movement, where the hand inner surface can touch the touch-sensitive surface in this position.

In an embodiment the control device is disposed on, adjacent to, and/or contiguous to the steering arrangement. The control device is preferably disposed on the steering device or on the steering column and/or is connected to this. For example, the control device can be disposed adjacent to and/or behind the steering wheel rim. In particular, the control device is disposed in such a manner that a short distance and/or short path exists between this control device and a hand of the vehicle driver which usually operates the steering device. The control device is especially disposed in such a manner that the vehicle driver need not completely remove his hand from the steering wheel rim in order to operate the control device.

In an embodiment, the touch-sensitive surface is disposed on a first end of a connecting arm. The connecting arm is connected to the steering arrangement with a second end. The connecting arm is preferably fastened on the steering column or on the steering device. A fastening of the connecting arm on the dashboard adjacent to or contiguous to the steering arrangement is also feasible.

Optionally, the connecting arm can be attached statically fixedly on or adjacent to the steering arrangement or is movably connected to the steering arrangement as a lever. Especially the lever is configured as a multifunctional switching lever, by which means an activation, for example, of a vehicle light and/or indicator is additionally made possible.

The touch-sensitive surface is preferably disposed on two connecting arms. It is feasible that the two connecting arms are disposed on both sides, in particular on a left and right side of the steering column and/or the steering device from the point of view of the vehicle driver. The vehicle driver can thus touch and operate the control device disposed on the right with his right hand and the control device disposed on the left with his left hand. It is feasible that different display devices can be actuated and/or operated with the touch-sensitive surfaces disposed on the left and the right. In particular different displays and/or functions on the display devices can be actuated with the touch-sensitive surfaces disposed on the left and the right. For example, it is therefore feasible that the touch-sensitive surface disposed on the left is configured to activate and/or to operate the first and/or the second display device whereas the touch-sensitive surface disposed on the right is configured to activate and/or operate the third and/or fourth display device.

In a possible further development according to the invention, the touch-sensitive surface comprises a first and a second surface portion. In particular, the first surface portion can be disposed adjacent to the second surface portion, the two surface portions being mutually complementary to the touch-sensitive surface. For example, both surface portions are configured to be semicircular and together form the circular or oval surface. It is also feasible that the second surface portion has a smaller area than the first. Optionally, the second surface portion is disposed on the first surface portion, covering a part of the first surface portion.

Preferably, different display devices can be activated and/or operated with the first and second surface portion. It is feasible that the vehicle driver can select and/or operate the first display device by touching the first surface portion and the second display device by touching the second surface portion. In particular, the input of various commands by the vehicle driver is made possible by touching the first or second surface portion. It is quite possible that the vehicle driver can make a selection between the individual display devices and activate these with the first surface portion and can operate and/or change the displays of the display devices with the second surface portion.

In a further embodiment, the control device is configured to operate the at least one display device by a single and/or double tap and/or by a direction-guided stroke movement on the touch-sensitive surface. Preferably the at least one display device can be activated by a single tap of the touch-sensitive surface. Alternatively, the vehicle driver can select or mark the display or a further link by the single tap. In particular, the display can be selected by the double tap and/or the link on the display can be activated by the double tap. With the direction-guided stroke movement over the touch-sensitive surface, the vehicle driver can, for example, guide a cursor over the display device. It is also feasible that the vehicle driver can vary the information and/or instructions, in particular in their intensity, by the direction-guided stroke movement.

For example, the control device is configured to activate the second display device by the single tap of the touch-sensitive surface. After the activation the second display device preferably displays a selection menu, which has numerous links to the other display devices and/or to further information, from which the vehicle driver can select. In particular, the control device is configured to move a cursor in that direction onto a link, in which the vehicle driver executes the direction-guided stroke movement. Optionally the vehicle driver can select and activate the desired link by the double tapping of the touch-sensitive surface, with the result that, for example, one of the other display devices is activated and/or the further information appears on the second display device. It is also feasible that the vehicle driver can set a volume of a radio, an interior temperature, or a fan intensity by touching, in particular by the direction-guided stroke movement.

In another embodiment, the touch-sensitive surface comprises proximity sensors, which detect an approach of the vehicle driver's hand. The at least one display device is preferably already switched on when the hand approaches the touch-sensitive surface, this displaying the selection menu.

In an embodiment, the touch-sensitive surface is configured to be illuminable. It is possible that only one surface portion is illuminable or illuminated or that the first surface portion is illuminable or illuminated in a different light color from the second surface portion. For example, the first surface portion is illuminated red when it or the display device/s to be operated therewith is/are deactivated. The second surface portion can be illuminated green when it is ready for use or when the display device/s to be operated therewith are activated. It is also feasible that the touch-sensitive surface or a surface portion lights up in the cycle of a set indicator or notifies an incoming call on a mobile phone carried in the vehicle.

Another embodiment provides that the first display device is disposed in the viewing direction of the vehicle driver behind the steering device, in particular behind the steering wheel, in the dashboard. The first display device is preferably disposed below and/or contiguous to the windshield. The designation "below" also describes hereinafter a direction which is directed from a vehicle roof to a vehicle floor. The designation "above" describes hereinafter the direction which is directed from the vehicle floor to the vehicle roof.

In particular, the first display device is visible for the vehicle driver above or at the level of the steering wheel rim, where this can in particular be dependent on a height adjustment of the steering wheel. The first display device can have any arbitrary shape and can therefore be adapted to an interior design of the vehicle. A rectangular, oval, or semicircular-shaped external contour of the first display device is preferred.

The second display device is preferably disposed on the steering column. In particular, the second display is located stationary between the dashboard and the steering device. It is also possible that the second display device is mounted movably and/or pivotally on the steering column. Optionally, the second display device is visible for the vehicle driver through openings between the steering wheel spokes. It is also feasible that the second display device has a square, rectangular, oval, or circular external contour. All other suitable forms are also possible, which like the first display device can be adapted to the interior design of the vehicle.

In an embodiment, a first viewing distance exists between the first display device and the vehicle driver and a second viewing distance exists between the second display device and the vehicle driver, wherein the second viewing distance is shorter than the first viewing distance. In particular, the first and second display device are arranged offset with respect to one another in the viewing direction of the vehicle driver and/or in the viewing distance to the vehicle driver. Especially, the information and/or instructions displayed on the first and second display device are detected by the vehicle driver in a fraction of a second, preferably within approximately 0.3 seconds, in particular within approximately 0.2 seconds.

In a further embodiment, the third display device is disposed in a windshield of the vehicle. The third display device is preferably integrated as a head-up display in the windshield. The third display device is in particular formed by a display panel, which is directed onto the roadway in front of the vehicle in the viewing direction of the vehicle driver. The third display device is preferably located above the first display device. In particular the third display device, at least in part, has a greater viewing distance from the vehicle driver than the first display device. Especially the information and/or instructions displayed on the third display device can preferably be detected by the vehicle driver within approximately 0.5 seconds, in particular within approximately 0.3 seconds.

In another embodiment, the fourth display device is disposed contiguous to and/or adjacent to the first display device in the dashboard. The fourth display device preferably extends along a still-remaining dashboard portion, which is disposed centrally on a passenger's side of the vehicle. The fourth display device is especially disposed centrally and/or in front of the passenger seat in the dashboard. Optionally the fourth display device has an elongate rectangular or oval shape.

A further embodiment provides that at least two of the four display devices are disposed in a step-like manner in a vehicle interior, in particular in the viewing direction of the vehicle driver. The third display device is preferably located highest and at least in part at the greatest distance from the vehicle driver. In particular, the first and optionally additionally the fourth display device are located below the third display device. Especially the first and optionally the fourth display device have at least in part a shorter viewing distance from the vehicle driver than the third display device. The second display device is preferably located the lowest and has the shortest viewing distance from the vehicle driver. Optionally the display devices can be disposed perspectively overlapping. The display devices are preferably disposed above, below, and/or laterally spaced apart from one another or they adjoin one another seamlessly on at least one side and/or in at least one direction. However, it is feasible that one display device overlaps with at least one other display device laterally, above, and/or below. For example, the displays of one or more display devices are continued in the display of another display device. In particular, the first display device can extend visually into the windshield and overlap with the display of the third display device. Especially, the extending display of the first display device can be taken over and continued by the third display device. Naturally, the displays of the second, third, and/or fourth display device can be continued in one or more displays. It is conceivable, for example, that the second display device overlaps with the first and/or the fourth display device overlaps with the third and that the displays thereof are mutually continued and/or displayed. All other feasible variants are also possible.

It is advantageous that the display devices can visualize different information and therefore a plurality of information. The display devices are preferably disposed in a main field of view of the vehicle driver, in particular in a viewing direction onto the steering device, the dashboard, and/or the windshield. Since the display devices are located at the greatest possible distance from the vehicle driver, they are adapted in an optimized manner to the ergonomics of the vehicle driver. Any (over)loading of the eye activity of the vehicle driver can therefore be advantageously counteracted. The vehicle driver can preferably use ergonomic synergy effects, which appear between the arrangement of the display devices and the arrangement of the control device. Both devices are in particular configured to reduce the fatigue and inattentiveness of the vehicle driver and to avoid resulting accidents.

It is furthermore advantageous that the display devices can be adapted to almost any interior design of the vehicle on account of an extensive flexibility in size and/or shape. As a result of this extended design freedom, an orientation to individual customer wishes is possible, with the result that customer interest can be aroused and possibly the value of a vehicle can be increased.

In a further embodiment, the first display device is configured for the display of primary information. The primary information preferably comprises operating and/or state information such as, for example, a velocity and/or speed display, an energy reservoir and/or tank fill level display, a vehicle range display, various control displays, an outside temperature and/or time display, and many more.

A further embodiment provides that the second display device is configured for the display of secondary information. It is particularly preferred that the second display device is configured to display additional and different information from the first display device. The secondary information preferably comprises information which can be set individually and precisely by the vehicle driver. For example, the secondary information can comprise displays about or relating to mobile devices used in the vehicle such as, for example, mobile telephones and/or smart phones. In particular, the secondary information comprises internet displays such as, for example, websites, mailbox, and/or rechargeable battery information of the mobile telephone which can be individually selected by the vehicle driver. Displays on the second display device, which comprise information on an air-conditioning system and/or on a radio in the vehicle, are also possible.

The third display device is preferably configured for the display of navigation and/or warning information. For this purpose, the vehicle is usually equipped with proximity sensors and/or a camera on one or more vehicle outer sides. In particular, a GPS receiver is installed in the vehicle. The navigation displays especially comprise direction information, route displays, road names, queue warnings, etc. The warning information preferably comprises information on traffic signs, persons, obstacles, or other vehicles on the roadway, in particular collision warnings. These are preferably displayed immediately on the third display device as soon as they appear in the surroundings of the vehicle and/or are detected by the proximity sensors and/or the camera.

In particular, the fourth display device is configured for the display of rear information. Preferably the fourth display device is configured to display to the vehicle driver and possibly a passenger the traffic and a road course behind the vehicle. It is also conceivable that a warning of an impending rear-end collision by a vehicle coming from behind is given or that the fourth display device serves as a parking aid. Optionally the fourth display device can replace or complement the function of a rear mirror. In particular, the vehicle is fitted for this purpose with proximity sensors and/or the camera on a rear seat outer side. It is conceivable that the displays, in particular the navigation and/or warning information and/or the rear information are made in a three-dimensional view.

The information display arrangement is preferably configured to reduce a loading of the vehicle driver accompanying the visual perception of the primary, secondary, and/or rear information and/or accompanying the visual perception of the navigation and/or warning information. To this end it is advantageous if the at least one display device is disposed as high as possible in the vehicle interior in relation to the vehicle floor. In particular, the at least one display device is disposed in the viewing direction of the vehicle driver and as far as possible away from this. The step-like arrangement of the at least two display devices in the vehicle interior already described can advantageously reduce an adjustment time of eyes and/or pupils of the vehicle driver to changed light conditions. In particular, an eye and/or pupil adaptation, in particular a loading caused by a focusing of objects, persons, and/or traffic outside the vehicle, can be reduced. The loading due to focusing of the displays on the display devices in the interior of the vehicle is also reduced thereby. Fatigue of the vehicle driver attributable to increased eye activity to detect the road traffic and/or the displays on the display devices can be delayed. It is thereby possible to maintain the powers of concentration of the vehicle driver for longer and to minimize the rise of accidents.

A further advantage is in particular that the displays of the third and fourth display device are visible for other vehicle occupants. It can thereby be possible for the occupants to stay in contact with the vehicle driver and be able to precisely assess the journey situation. The displays preferably provide more entertainment for the occupants and the vehicle driver during the journey.

BRIEF DESCRIPTION OF THE DRAWINGS

The present invention will hereinafter be described in conjunction with the following drawing figures, wherein like numerals denote like elements, and:

FIG. 5 shows a frontal view of a steering device and the control device and the information display arrangement from FIG. 1, FIG. 2, or FIG. 3.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
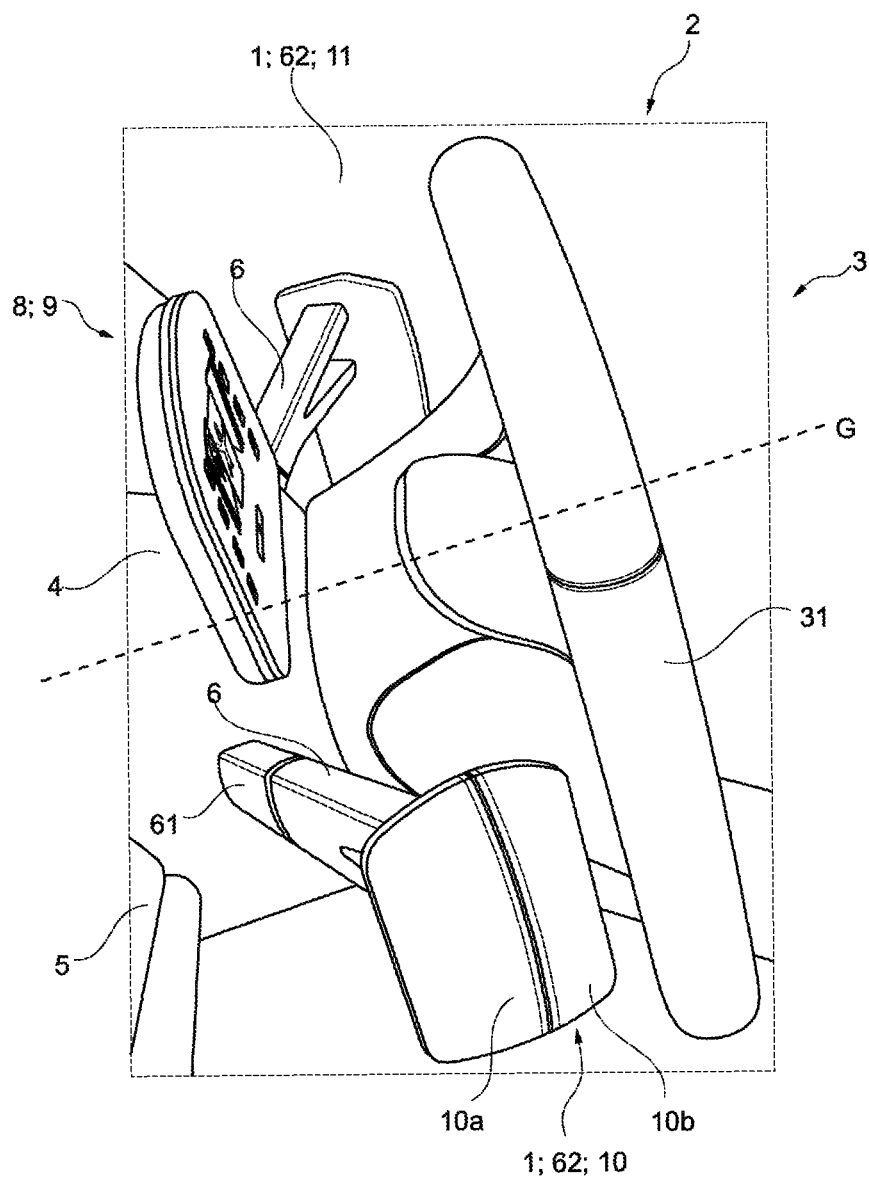
FIG. 1 shows a perspective side view of a control device for an information display arrangement.

FIG. 1 shows a perspective side view of a control device 1 as an exemplary embodiment. The control device 1 is integrated in a vehicle interior of a passenger car, the passenger car having a steering arrangement 2. The steering arrangement 2 comprises a steering device 3 which is configured as a steering wheel 3 with steering wheel rim 31. The steering arrangement 2 further comprises a steering column 4, which connects the steering wheel 3 to a dashboard 5. A connecting arm 6 is located on both sides of the steering column 4. The connecting arm 6 comprises a first end 61 and a second end 62, the first end 61 being fastened to the steering column 4 and the second end 62 being disposed adjacent to and/or contiguous to the steering wheel rim 31.

The control device 1 is formed by a first and a second touch-sensitive surface 10; 11, so-called touchpads 10; 11. The touchpads 10; 11 have a substantially rectangular external contour. They are disposed at the second end 62 of the two connecting arms 6 and adjacent to or contiguous to the steering wheel rim 31.

The first touch-sensitive surface 10 comprises a first surface portion 10a and a second surface portion 10b, the first surface portion 10a having a larger area than the second surface portion 10b. The two surface portions 10a; 10b are disposed adjacent to one another and make up the touch-sensitive surface 10. The first and second touch-sensitive surface 10; 11 are configured to be illuminable, the first and second surface portion 10a; 10b being illuminable in different colors.

A straight line G runs through a center of the steering wheel 3. The straight line G forms an axis of rotation about which the vehicle driver 7 turns the steering wheel rim 31. The first and second touch-sensitive surface 10; 11 are positioned radially to the straight line G. In addition, the touch-sensitive surfaces 10; 11 have a radius or a bend, which is adapted to the radius of the steering wheel rim 31.

For operating the control device 1, a vehicle driver 7 does not need to take his hands completely from the steering wheel rim 31. In particular, it is sufficient to stretch an index and/or middle finger of one hand to operate the adjacently disposed touchpads 10; 11. Consequently, the control device 1 is arranged ergonomically favorably in the vehicle interior. Since the vehicle driver 7 does not need to direct his view away from a roadway and can leave his hands on the steering wheel 3, he is less distracted from the journey events. Due to an increased attentiveness, accidents can be avoided.

A second display device 8 is disposed on the steering column 4. The second display device 8 is part of an information display arrangement 9 comprising a total of four display devices 18; 8; 19; 20. The second display device 8 is configured as a liquid crystal display (LC display) for the display of images, numbers, letters, and/or other symbols.

The control device 1 is configured for operating the information display arrangement 9. When the hand approaches the first and/or second touch-sensitive surface 10; 11, the illumination is activated, whereby the first and/or second touch-sensitive surface 10; 11 is illuminated. By touching the first surface portion 10a, the vehicle driver 7 can activate the second display device 8, a selection menu 12 having a plurality of links 13 to the display device 8 being displayed. One of the links 13 can be selected by touching the second surface portion 10b. After selection of the link 13, the linked instructions and/or information are displayed on the second display device 8.

Figure 2:
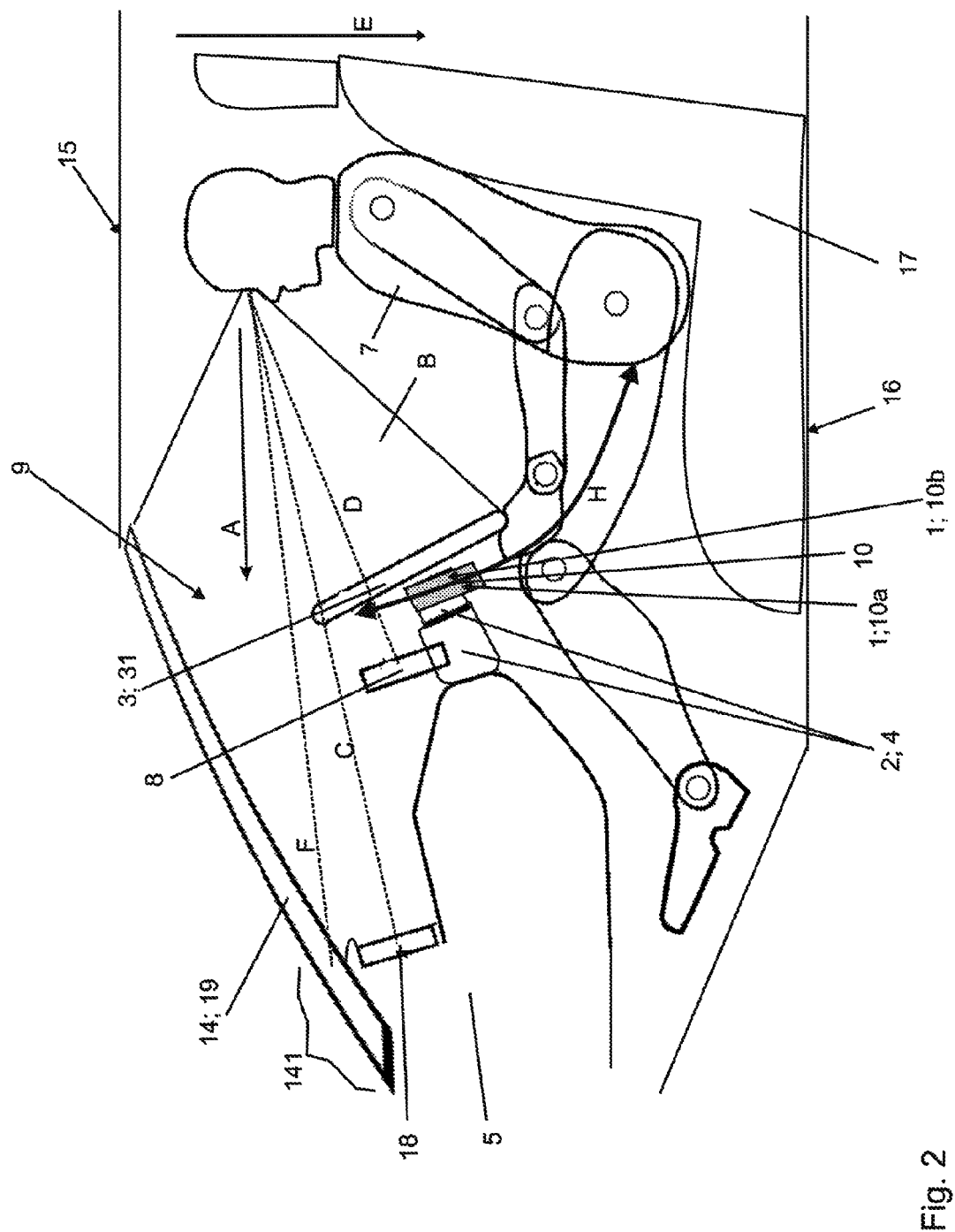
FIG. 2 shows a schematic side view of the control device and the information display arrangement from FIG. 1.

FIG. 2 shows a schematic side view of the control device 1 and the information display arrangement 9 from FIG. 1 in a frontal region of the passenger car. The frontal region of the passenger car is delimited by a windshield 14, a vehicle roof 15, and a vehicle floor 16. The dashboard 5 and the steering arrangement 2 are located below the windshield 14, in particular in a direction from the vehicle roof 15 to the vehicle floor 16 (according to arrow E).

The vehicle driver 7 sits on a driver's side on a driver's seat 17 in front of the steering arrangement 2 and looks in the direction of the windshield 14 (direction of sight/viewing direction of the vehicle driver 7 according to arrow A). From the view (according to arrow A) of the vehicle driver 7, the control device 1 is located on a left and right side of the steering arrangement 2 (the right side is not visible in FIG. 2). The control device 1 is disposed in a semicircular arm movement area H of the vehicle driver 7 in the vehicle interior, with the result that it is mounted ergonomically advantageously and is easy to reach for the vehicle driver 7. A short distance between the steering wheel 3 and the control device 1, as well as the semicircular arm movement direction H of the vehicle driver 7 promote a physical and mental unloading and help to avoid fatigue, inattentiveness, and accidents.

The first touch-sensitive surface 10 is directed toward a driver's door not shown. The second touch-sensitive surface 11 is directed toward a passenger's door (not visible in FIG. 2). The first and second touch-sensitive surfaces 10; 11 are arranged almost parallel to the driver's and passenger's door. From the view (according to arrow A) of the vehicle driver 7, the touch-sensitive surfaces 10; 11 are only perspective and about approximately 15% visible.

The information display arrangement 9 comprises a first display device 18, which is disposed behind the steering wheel 3 in the dashboard 5 in the viewing direction (according to arrow A) of the vehicle driver 7. The first display device 18 is visible for the vehicle driver 7 above the steering wheel rim 31 and is disposed in a field of view B of the vehicle driver 7. The first display device 18 is configured as an LC display like the second display device.

The information display arrangement 9 comprises the second display device 8, which is disposed on the steering column 4. The second display device 8, like the first display device 18, is disposed in the field of view B of the vehicle driver 7. The second display device 8 is located below (according to arrow E) the first display device 18.

The first and second display device 18; 8 are arranged offset in the viewing direction (according to arrow A) of the vehicle driver 7, in particular offset one behind the other. Between the first display device 18 and the vehicle driver 7 there is a first viewing distance C. Between the second display device 8 and the vehicle driver 7 there is a second viewing distance D. The second viewing distance D is shorter than the first viewing distance C. As a result, the first display device 18 can be designated as "far away screen" and the second display device 8 as "close screen".

The information display arrangement 9 comprises a third display device 19, which is integrated in the windshield 14. The third display device 19 is configured as a head-up display 19 and is located at least partially above (in the opposite direction to the arrow E) the first and second display devices 18; 8 in the field of view B of the vehicle driver 7. The information display arrangement 9 further comprises a fourth display device 20, which is located contiguous to and adjacent to the first display device 18 in the dashboard 5. This is therefore also located in the field of view B of the vehicle driver 7 (not visible in FIG. 2). The fourth display device 20 is also configured as an LC display.

The four display devices 18; 8; 19; 20 are disposed partially in a stepped manner to one another in the vehicle interior, the third display device 19 being the uppermost (in the opposite direction to the arrow E) and disposed at a third viewing distance F from the vehicle driver 7. The third viewing distance F is variable with a curvature of the windshield 14 and decreases in the direction of the vehicle roof 15. At least in a windshield section 141 located behind (according to arrow A) the first display device 18 in the windshield 14, the third viewing distance F is greater than the first viewing distance C. The first and fourth display device 18; 20 are disposed below (according to arrow E) the third display device 19. The second display device 8 is disposed below the first and fourth display device 18; 20. In addition, the second viewing distance D is shorter than the first viewing distance C.

Consequently, the third display device 19 is located on a last and/or uppermost imaginary step in the vehicle interior. This has the largest viewing distance F to the vehicle driver 7 in the windshield section 141. The first and fourth display device 18; 20 are located on the middle step and the second display device 8 is located on the lowest step. The lowest step has the shortest viewing distance D to the vehicle driver 7.

Figure 3:
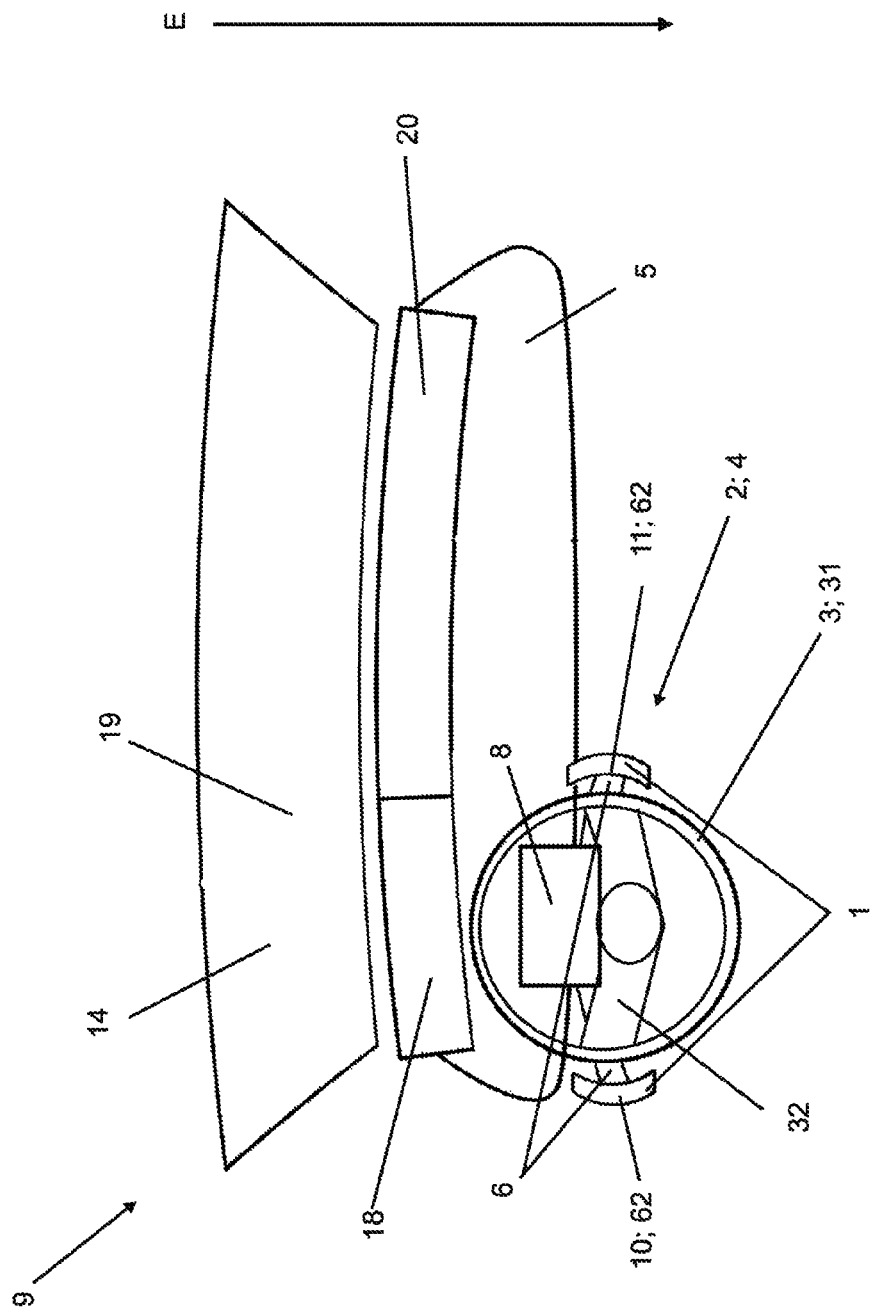
FIG. 3 shows a schematic frontal view of the control device and the information display arrangement from FIG. 2.

FIG. 3 shows a schematic frontal view of the control device 1 and the information display arrangement 9 in the front area of the passenger car. In particular, the field of view B of the vehicle driver 7 sitting on the driver's seat 17 is shown. The field of view B includes the driver's side and a passenger side in the vehicle interior.

The first and the second touch-sensitive surface 10; 11 are disposed at the outer ends 62 of the two connecting arms 6, which are mounted on both sides on the steering column 4. The connecting arms 6 are movably connected to the steering column 4 and configured as multifunctional switching levers 6. The switching levers 6 are additionally configured for activations of indicators and/or headlamps of the passenger car. When activating the indicators by switching the switching lever 6, that illuminable touch-sensitive surface 10; 11 on the side whereof the indicator was set flashes in the rhythm of the indicator.

The third display device 19 is integrated as a head-up display 19 in the windshield 14 of the vehicle. The first display device 18 is located under the third display device 19 (according to arrow E) on the driver's side in the dashboard 5.

The first display device 18 is located above (in the opposite direction to arrow E) the steering wheel above the steering wheel rim 31. The fourth display device 20 is located in the dashboard 5 adjacent to the first display device 18. The fourth display device 20 extends from a center of the dashboard to the passenger's side. It is visible for the vehicle driver 7 without or through a small eye and/or head movement. The second display device 8 is located underneath (according to arrow E) the first display device 18. It is mounted on the steering arrangement 2, in particular on the steering column 4, and is visible for the vehicle driver 7 through spokes 32 of the steering wheel 3.

Figure 4:
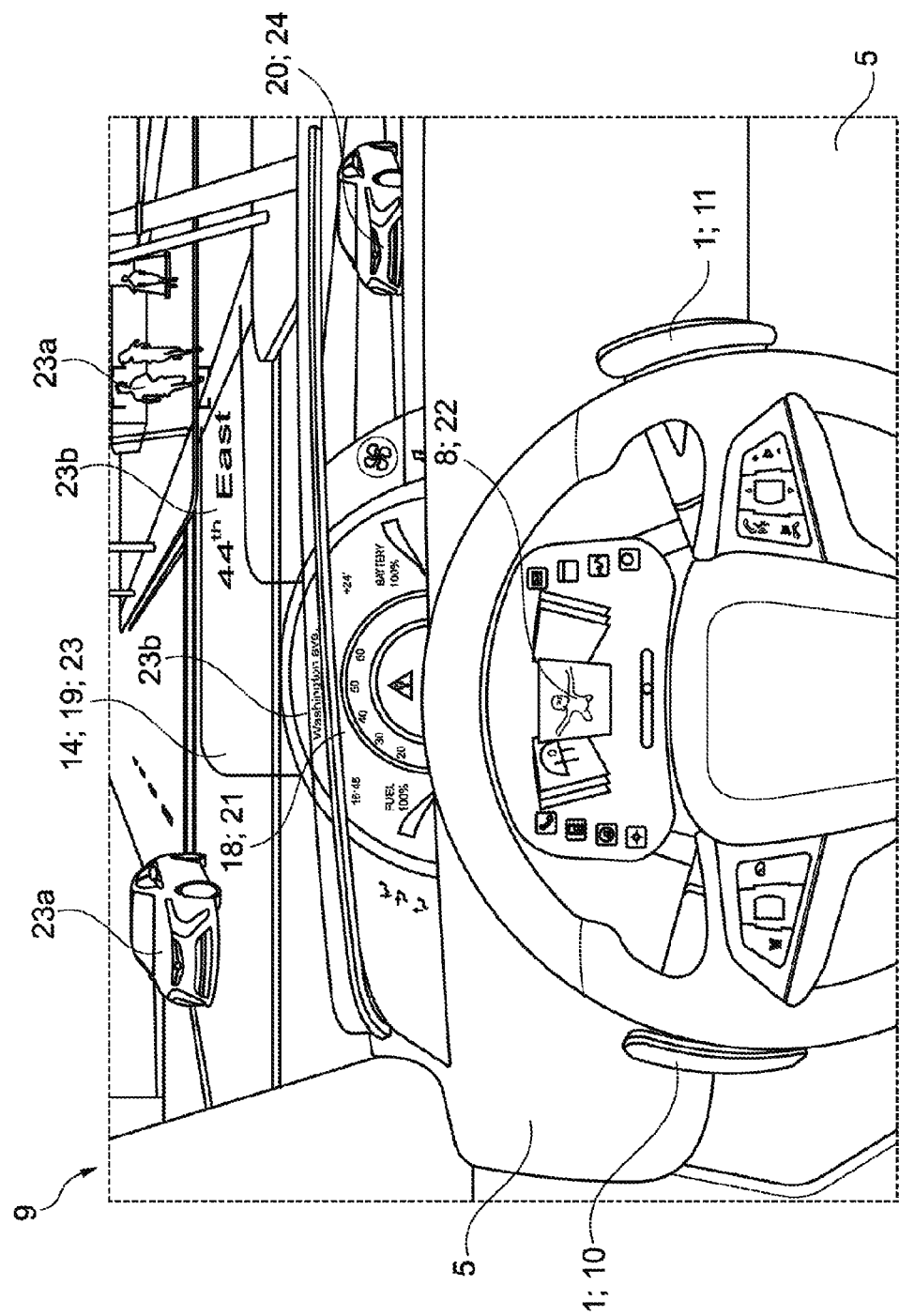
FIG. 4 shows a frontal view of the control device and the information display arrangement from FIG. 2 or FIG. 3.

FIG. 4 shows another frontal view of the control device 1 and the information display arrangement 9 from FIG. 2 or FIG. 3. The first display device 18 is configured for a display of primary information 21 such as velocity, speed, tank fill level, range, etc. In a perspective, the first display device 18 overlaps with the third display device 19, since the display of the first display device 18 is continued on the third display device 19.

The second display device 8 is configured to display secondary information 22. The secondary information comprises individual displays such as, for example, freely selectable internet websites or displays relating to mobile equipment carried in the vehicle such as, for example, mobile telephones. Information on an air conditioning system or a radio device is also possible. The third display arrangement 19 is configured for a display of navigation and/or warning information 23. The navigation information 23a comprises the information of a navigation system installed or carried in the vehicle such as, for example, the display of the direction or the course of the road, the provision of road names and/or names of public facilities and/or sights etc. The warning information 23b comprises information on the traffic ahead of the vehicle. For this purpose, the third display device 19 is configured to point out and/or identify traffic signs, pedestrians, vehicles, and sources of danger.

The fourth display device 20 is configured for a panorama-like display of rear information 24. It can therefore be designated as a "panorama rear-view screen". The fourth display device 20 can replace or complement a function of a rear mirror in the vehicle, since it displays the course of the road, traffic, and/or possible sources of danger in the rear area or behind the vehicle. The vehicle is fitted with a plurality of cameras and proximity sensors for the display of navigation and/or warning information 23 and/or rear information 24. The cameras and/or proximity sensors are configured to acquire data for the navigation and/or warning information 23 and/or rear information 24 and transmit this to the information display arrangement 9.

The control device 1 is configured to control the information display arrangement 9, in particular the display devices 18; 8; 19; 20. For this purpose, the first and second touch-sensitive surface 10; 11 is configured to respond to a touch of the vehicle driver 7. The type of touch is explained in detail in FIG. 5a-FIG. 5d. FIG. 5a, FIG. 5b, FIG. 5c, FIG. 5d each show a frontal view of the steering wheel 3, the control device 1, and the second display device 8. FIG. 5b, FIG. 5c, FIG. 5d show different operating and/or function states of the control device 1 and display device 8.

FIG. 5a shows the control device 1, which is disposed on the left and right side of the steering wheel 5 and which is formed by the first and second touch-sensitive surface 10; 11. These are disposed on the outer ends 62 of the connecting arms 6 (not shown here). The first touch-sensitive surface 10 located on the left has two surface portions 10a; 10b and the second surface 11 located on the right has two further surface portions 11a; 11b.

In the embodiments of FIG. 5b, FIG. 5c, FIG. 5d, only the operation of the first surface portions 10a; 10b located on the left adjacent to the steering wheel 3 is shown. In an alternative exemplary embodiment the second surface portions 11a; 11b located on the right can be operated in the same or a similar manner.

FIG. 5b shows that the first control device 10 located on the left, is configured to activate the second display device 8 and activate the selection menu 12 by a single tap 25 of the first surface portion 10a. The selectable links 13 are displayed in the selection menu 12. FIG. 5c shows that the vehicle driver 7 can move a cursor in the user menu 12 and position it on a link 13 which he desires by a direction-guided stroke movement 26 on the first surface portion 10a. FIG. 5d shows that the vehicle driver 7 can select and activate the link 13 by a double tap 27 of the first surface portion 10a. The second display device 8 then displays the linked secondary information 22.

In another embodiment, the single tap 25 is made on the second surface portion 10b, whereby the first display device 18 is switched on and displays the primary information 21. The cursor can be displaced within the primary information 21 by the direction-guided stroke movement 26 on the second surface portion 10b. In turn, the selected primary information 21 can be selected and possibly varied by the double tap 27 of the second surface portion 10b.

The operation of the second touch-sensitive surface 11 located on the right adjacent to the steering wheel 3 can proceed similarly, in particular at the surface portions 11a; 11b located there. These ensure the operation of the third and fourth display device 19; 20 in a similar manner to that already described.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A control device in a vehicle, comprising:
 a steering arrangement comprising a steering device;
 an information display arrangement comprising a display device; and
 a connecting arm having a first end and a second end connected to the steering arrangement, the connecting arm comprising: a touch-sensitive surface disposed on the first end and being configured to control the information display arrangement, wherein the touch-sensitive surface is aligned radially to an imaginary straight line through a center of the steering device directed toward a door of the vehicle, and comprises:
  a first surface portion that is used to activate the display device to display a plurality of links; and
  a second surface portion that is different than the first surface portion and that is used to select a link displayed on the display device.

2. The control device according to claim 1,
wherein the touch-sensitive surface extends at least partially along a semicircular arm movement area of a vehicle driver located on a driver seat in front of the steering arrangement, and
wherein the semicircular arm movement area is formed by an arm movement of the vehicle driver in a direction of the steering arrangement.

3. The control device according to claim 1, wherein the display device is operated by a tap on the touch-sensitive surface.

4. The control device according to claim 1, wherein the touch-sensitive surface is illuminable.

5. The control device according to claim 1, wherein the information display arrangement comprises a first display device behind the steering device in a dashboard in a viewing direction of a vehicle driver.

6. The control device according to claim 5, wherein the information display arrangement comprises a second display device disposed on a steering column of the steering arrangement.

7. The control device according to claim 6,
wherein a first viewing distance exists between the first display device and the vehicle driver,
wherein a second viewing distance exists between the second display device and the vehicle driver, and
wherein the second viewing distance is shorter than the first viewing distance.

8. The control device according to claim 6, wherein the information display arrangement comprises a third display device integrated in a windshield.

9. The control device according to claim 8, wherein the information display arrangement comprises a fourth display device disposed at least adjacent to the first display device in the dashboard.

10. The control device according to claim 9, wherein at least two of the first display device, the second display device, the third display device or the fourth display device are disposed in a step-like manner in an interior of the vehicle.

11. The control device according to claim 9, wherein the fourth display device is configured to display rear information.

12. The control device according to claim 8, wherein the third display device is configured to display navigation information.

13. The control device according to claim 8, wherein the third display device is configured to display warning information.

14. The control device according to claim 6, wherein the first display device is configured to display primary information.

15. The control device according to claim 14, wherein the second display device is configured for display of secondary information.

16. A control device in a vehicle, comprising:
a steering arrangement comprising a steering device;
an information display arrangement comprising a display device; and
a touch-sensitive surface being configured to control the information display arrangement, wherein the touch-sensitive surface is aligned radially to an imaginary straight line through a center of the steering device directed toward a door of the vehicle, wherein the touch-sensitive surface is divided into:
a first surface portion that is used to activate the display device to display a plurality of links; and
a second surface portion that is used to select a link displayed on the display device, wherein the second surface portion is different than and physically separate from the first surface portion.

* * * * *